United States Patent [19]

Ingram et al.

[11] Patent Number: 4,535,875

[45] Date of Patent: Aug. 20, 1985

[54] ACTUATOR FOR AN INTERNAL SHOE DRUM BRAKE

[75] Inventors: Brian Ingram, Coventry; Michael J. England, West Midlands, both of England

[73] Assignee: Lucas Industries, Public Limited Company, Birmingham, England

[21] Appl. No.: 471,711

[22] Filed: Mar. 3, 1983

[30] Foreign Application Priority Data

Mar. 9, 1982 [GB] United Kingdom ............... 8206792

[51] Int. Cl.³ .............................................. F16D 65/24
[52] U.S. Cl. ............................. 188/106 F; 188/196 D; 188/343; 188/364; 192/83; 192/111 A
[58] Field of Search .................... 188/196 D, 199, 202, 188/106 F, 106 A, 343, 364; 192/83, 93 C, 96, 111 A; 74/110

[56] References Cited

U.S. PATENT DOCUMENTS

| | | | |
|---|---|---|---|
| 3,809,189 | 5/1974 | Farr | 192/111 A X |
| 3,811,538 | 5/1974 | Farr | 188/196 D X |
| 3,811,539 | 5/1974 | Farr | 188/106 A |
| 3,838,757 | 10/1974 | Farr | 188/196 D X |
| 3,878,923 | 4/1975 | Farr | 188/196 D |
| 4,013,150 | 3/1977 | Crabtree | 188/343 X |
| 4,056,173 | 11/1977 | Farr | 188/196 D X |
| 4,122,921 | 10/1978 | Diggs et al. | 188/79.5 GE |

FOREIGN PATENT DOCUMENTS

| | | | |
|---|---|---|---|
| 1204087 | 10/1965 | Fed. Rep. of Germany | 188/106 F |
| 1555231 | 12/1968 | France | 188/106 F |
| 1135994 | 12/1968 | United Kingdom | 188/106 A |

Primary Examiner—George E. A. Halvosa
Attorney, Agent, or Firm—Holman & Stern

[57] ABSTRACT

An actuator for a shoe drum brake has a body containing a tappet engaging one of a pair of brake shoes, and a split tappet of which the outermost piston engages the other brake shoe. A mechanical wedge actuator acts between the tappets for emergency and parking operation. The piston cooperates with an automatic adjuster of which a component normally engages an abutment member which bears against a shoulder within the body to isolate the adjuster from the piston of the split tappet and thereby from the other tappet.

12 Claims, 2 Drawing Figures

4,535,875

ACTUATOR FOR AN INTERNAL SHOE DRUM BRAKE

BACKGROUND OF THE INVENTION

1. Field of the Invention

This invention relates to an actuator for an internal shoe drum brake, the actuator including means for alternative fluid pressure and mechanical actuation of the brake.

2. Description of the Invention

Various forms of such a combined actuator are already known, the most common combining a hydraulic cylinder and a mechanical wedge device for effecting respectively the two alternative forms of actuation. One of these conventional arrangements includes a wedge device disposed between tappets sliding in respective bores in the actuator housing, the wedge being operable via a pair of rollers to move the tappets outwardly of the housing to actuate a pair of brake shoes. One of the tappets is split along a diametrical plane to form a pair of pistons with a hydraulic chamber between them to permit the pistons to be urged in opposed directions by application of hydraulic pressure, one of the pistons acting to expand the immediately adjacent shoe and the other acting on the other tappet to expand the other shoe. The wedge and roller assembly is capable of limited lateral movement to accommodate this.

Automatic adjustment is a common requirement in present day actuators and because of the generally unfavorable environment in which the actuators have to operate, the adjuster is commonly located internally of the actuator and thereby protected from the environment. It is usually desirable for the tappets to be adjustable independently of each other so that each adjusts only in response to excess movement of the shoe which it actuates. However, with the split-tappet arrangement described above, this requirement has hitherto been impossible to fulfil and an object of the invention is to provide a brake actuator which includes both mechanical wedge and hydraulic actuation means, of which the latter includes a split tappet.

BRIEF SUMMARY OF THE INVENTION

According to the invention, an actuator for a shoe drum brake comprises an actuating wedge disposed between a pair of force transmitting tappets slidable in opposed bores of the actuator body and intended, in use, to transmit actuating force to a pair of brake shoes to expand the latter, one of the tappets being split along a diametrical plane to form a pair of pistons with a hydraulic chamber between them to permit the pistons to be urged in opposed directions by the application of hydraulic pressure to the chamber, each tappet being operatively associated with respective automatic adjustment means operable, in use, to maintain a substantially constant shoe to drum clearance, the adjustment means associated with the split tappet being arranged to operate in isolation from the innermost piston of the split tappet.

In one convenient arrangement, the adjuster associated with the split tappet includes a screw device co-operating with the outermost piston of the split tappet, and clutch means co-operating with the screw device and with fixed abutment means to control operation of the screw device in response to outward movement of said outermost piston. The fixed abutment means may conveniently be disposed between the pistons and urged, in a direction away from said outermost piston, to engage means fixed with respect to the actuator body. The fixed abutment means is preferably urged into engagement with the actuator body. The clutch means is preferably in threaded engagement with the screw device and face to face engagement with the fixed abutment means.

In one preferred arrangement, the screw device is provided with a fast thread with which a similar thread on the clutch member co-operates, whereby interaction of the clutch member with said fixed abutment means and screw device causes rotation of the screw device, as a result of outward movement of said outermost piston, in a direction such as to set an outwardly adjusted retracted position of the piston.

BRIEF DESCRIPTION OF THE DRAWINGS

The invention will now be described, by way of example, with reference to the accompanying drawings, wherein.

DETAILED DESCRIPTION

Figure 1:
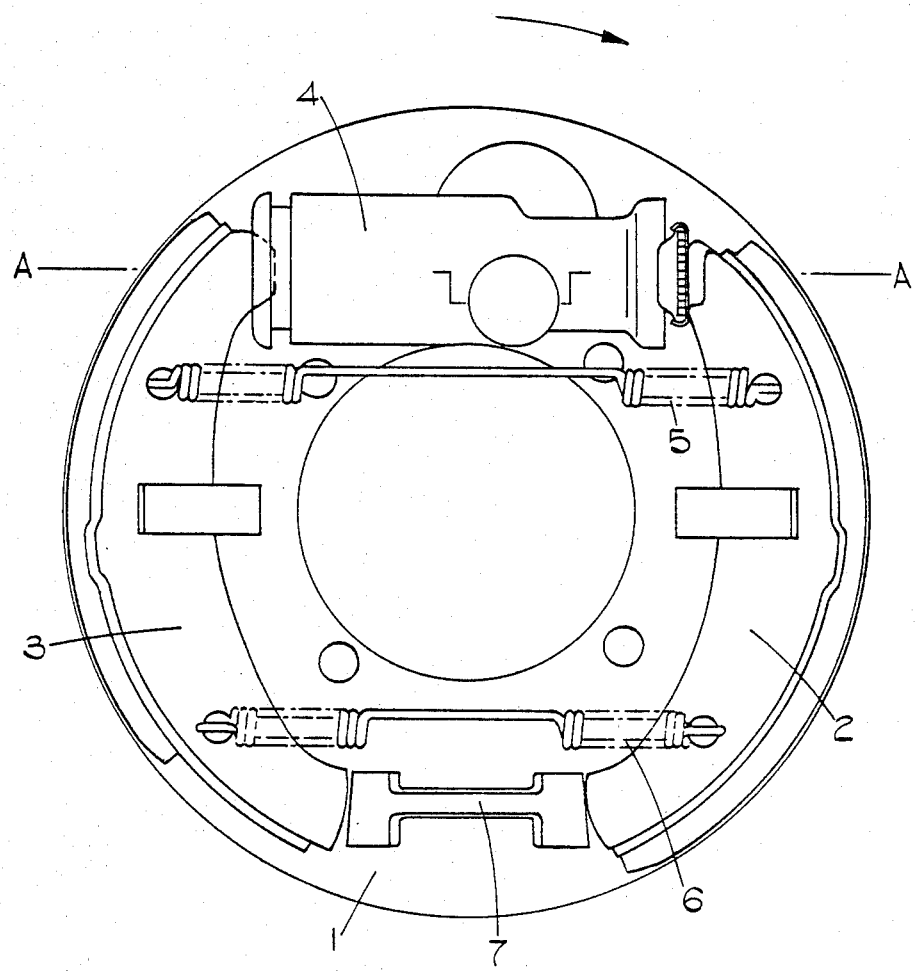
FIG. 1 is an end view of an internal shoe drum brake incorporating one form of the actuator of the invention.

Referring to FIG. 1, the drum brake shown therein has a torque plate 1 carrying a pair of brake shoes 2, 3. An actuator 4 is rigidly mounted on the torque plate between one pair of adjacent shoe ends and is operable to move the shoes outwardly into braking engagement with a surrounding brake drum (not shown), against the action of a pair of shoe return springs 5 and 6. The other pair of adjacent shoe ends engage a torque-reacting abutment member 7 rigidly fixed to the torque plate. The normal forward direction of drum rotation is indicated by the arrow.

Figure 2:
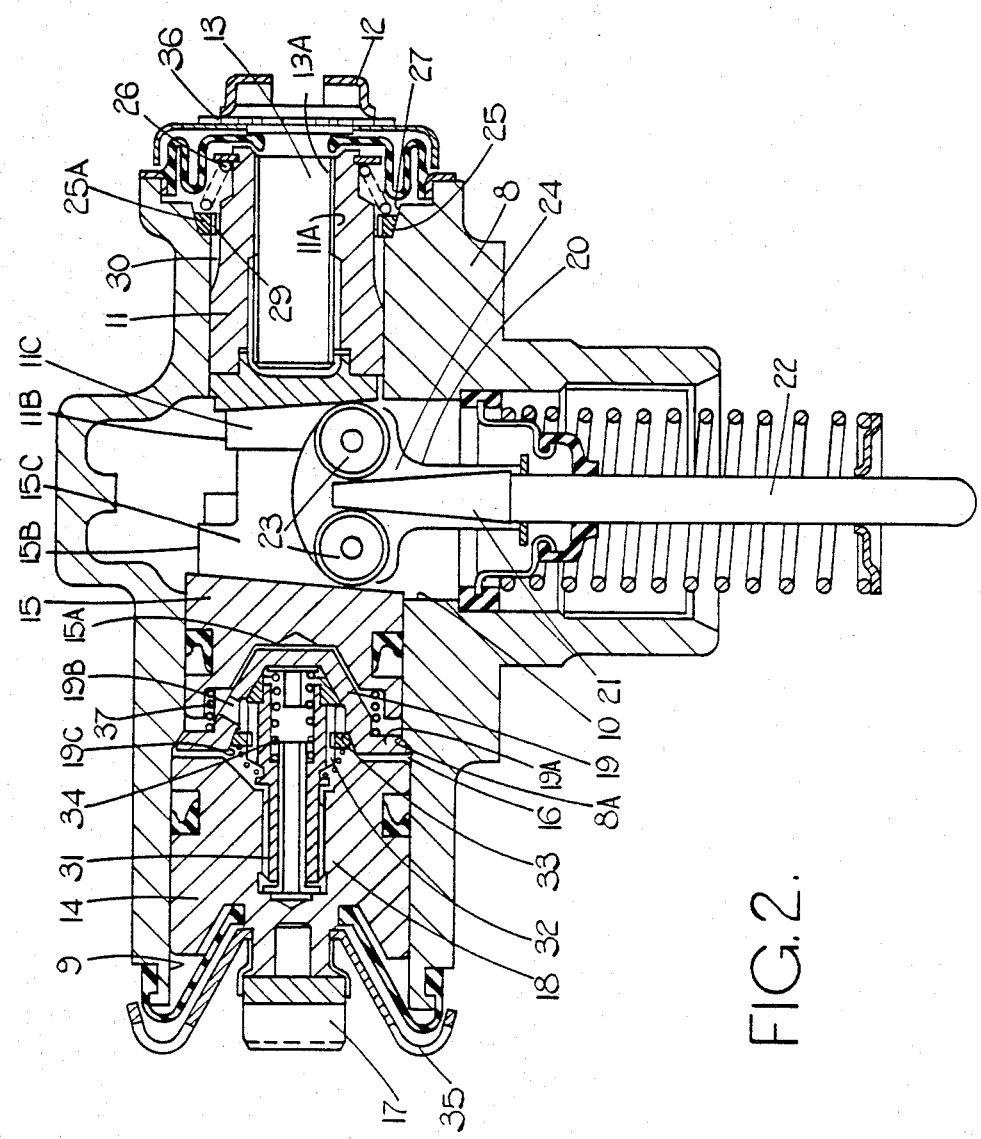
FIG. 2 is a longitudinal cross section of an actuator of the drum brake of FIG. 1.

The actuator 4 is shown in greater detail in FIG. 2. The actuator has a body 8 having a through bore 9 and a transverse bore 10 extending at right angles to the bore 9. The right hand end portion of the bore 9, as seen in the drawings, contains a tappet 11 slidable therein and having a tappet head 12 which engages the adjacent brake shoe. The head 12 is carried by an adjuster screw 13 having external screw thread 13A threadedly engaged within an internally threaded 11A axial bore of the tappet 11, the screw forming part of an automatic adjuster for the tappet 11 which will be described in more detail hereinafter.

The left hand end portion of the bore 9 contains a tappet which is split diametrically to form a pair of pistons 14, 15 between which is defined an hydraulic chamber 16 for the application of hydraulic pressure to both pistons. The outermost piston 14 is provided with a tappet head 17 for engagement with the adjacent brake shoe and is associated with an adjuster mechanism 18 disposed therebetween and of which a detailed description will be provided hereinafter. Service actuation of the brake occurs upon separation of the pistons 14, 15 by application of hydraulic pressure to the chamber 16.

A portion 15B of the piston 15 extends inwardly across the bore 10 into engagement with a portion 11B of the tappet 11. The diameter of the portion 11B is greater than that of the abutting end of the portion 15B, permitting the portion 11B to abut against an annular shoulder (not shown) formed in the housing and providing a limit stop for inward movement of the tappets under the action of the shoe return springs.

The actuator body 8 is provided with an internal shoulder 8A to provide a seat for a generally frusto-conical cup 19 located between the pistons 14, 15 and partially housed within a correspondingly shaped recess 15A of the piston 15. The cup 19 is provided with a flange 19A and acts in conjunction with part of the automatic adjuster mechanism 18 in a manner to be described. A port 19B through the cup facilitates flow of fluid through the chamber 16 from one side of the cup to the other.

Mechanical actuating means, for emergency and parking actuation of the brake is provided in the form of a wedge device 20 of conventional form. The device 20 includes a wedge 21 fast with and reciprocal by means of an actuating rod 22, the wedge being located between a pair of rollers 23 carried by a cage 24 mounted on the rod 21. The cage and roller assembly is housed in slots 15C and 11C formed respectively in the piston 15 and tappet 11. The rod 22 would normally be connected to a spring and/or air-operated mechanical actuator of conventional type. Inward thrust applied to the rod 22 by the actuator causes the wedge 21 to separate the rollers 23 which push on the tappet 11 and the tappet constituted by the piston assembly 14, 15 to cause outward expansion of the shoes via the tappet heads 12 and 17. In the brake described, both the service and mechanical methods of actuation provide a leading-trailing shoe operation of the brake in either the forward or reverse direction of rotation.

The adjuster associated with the tappet 11 includes, in addition to the adjuster screw 13, a so called drive ring 25, the outer peripheral surface 25A of which is bevelled to provide a clutch face which is urged by a spring 26 into engagement with a corresponding internal surface of the housing 8 so that rotation of the drive ring is normally prevented. The internal circumference of the drive ring is provided with a fast thread 29 which is in mesh with a corresponding external thread 30 formed on the tappet 11. A predetermined degree of backlash is provided between the fast threads, permitting a certain maximum amount of outward movement of the tappet 11 without effect upon the drive ring and it is this which determines the predetermined maximum shoe to drum clearance in the brake.

When the outward movement of the tappet 11, as a result of either hydraulic or mechanical actuation, exceeds that required to take up the backlash in the fast threads, the drive ring is urged out of engagement with the clutch face 27 against the action of the spring 26 and when the frictional torque generated by this spring is overcome by the torque generated between the fast threads, the drive ring rotates by an amount dependent upon the outward movement of the tappet 11. Return movement of the tappet 11 towards the brakes-off position results in the drive ring once more engaging the clutch face 27 and being thereby prevented from rotating, so that reaction between the fast threads on the drive ring and tappet 11 causes the tappet to rotate. Since the adjuster screw 13 is prevented from rotating by its engagement at 12 with the adjacent web of shoe 2, the screw threads 11A and 13A cooperate so that rotation of the tappet caused by fast threads 29, 30, as described above, causes screw 13 to move axially outwardly of the tappet and thereby effectively increase the length of the screw and tappet assembly to set a new outwardly adjusted retracted position for the adjacent shoe.

The adjuster assembly 18 is similar in principle to that described above and has an adjuster shaft 31 threadedly engaged within a bore of the piston 14 and having an externally fast threaded portion 32 surrounded and engaged by a correspondingly internally threaded drive ring 33. Since the pistons 14 and 15 move apart upon service brake actuation, it is necessary to provide a surface fixed with respect to the housing 8 which can be used as a clutch surface for engagement by the drive ring so as to isolate the adjuster assembly from the innermost piston 15. This function is performed by the flanged cup 19 which is urged firmly against the internal shoulder 8A of the housing by a spring 34 contained within the shaft 31. The cup 19 has a bevelled internal surface 19C providing a clutch face for engagement by an external conical surface on the drive ring 33. The piston 15 is lightly urged permanently into engagement with the tappet 11 by a spring 37 acting between the cup 19 and piston 15.

When hydraulic pressure is supplied to the chamber 16, the pistons 14 and 15 are urged apart, fluid reaching the piston 15 by flowing through the port 19B in the cup 19. The tappet head 17 of the piston 14 acts directly on its adjacent shoe, while the piston 15 acts directly on the tappet 11 to move the latter outwardly, the wedge actuating rod 22 being capable of limited angular movement to permit the roller assembly to move with the pistons. In the event that the shoe engaged by the tappet head 17 moves further than the maximum shoe to drum clearance set by play in the fast threads of the drive ring 33 and shaft 31, the drive ring is urged by the threads away from its clutch seat on the cup 19 and rotates by an amount dependent upon outward shoe movement. When the pressure is released in the chamber 16 and the adjacent brake shoe is retracted by the return springs 6 and 7, the drive ring is urged once again into clutching engagement with the cup 19 and the adjuster shaft 31 is thereafter caused to rotate by interaction between the fast threads, moving the piston 14 outwardly by a small distance, thereby to set a new adjusted retracted position of the shoe.

It is advantageous for the piston 14 to be of larger diameter than the piston 15, so that by letting the smaller diameter piston 15 act on the leading shoe and the larger diameter piston 14 on the trailing shoe, the braking outputs at the two shoes can be brought nearer to equality than if the pistons were of the same diameter. Moveover, the shoulder 8A of the body 8 in the embodiment described, formed at the junction between the larger and smaller diameter portions of the bore 9, conveniently provides a fixed location for the cup 19. It would, of course, be possible to use pistons of the same diameter, but the shoulder for 8A could not then be provided and the washer 19 would have to be retained by alternative means such as a circlip or similar device mounted on the housing.

A toothed wheel 35 is made fast for rotation with the piston 14, enabling the latter to be rotated manually in order to permit manual adjustment of the brake, as for example when it is desired to retract the shoes from their normal positions in order to remove the brake drum. A similar facility is provided on the tappet 11, by providing a toothed wheel 36 fast with the adjuster screw 13.

The arrangement of the invention will be seen to provide a simple and convenient arrangement enabling automatic adjusters to be incorporated in a twin tappet actuator having one split tappet whilst permitting automatic adjustment of each tappet to occur independently of the other.

We claim:

1. In an actuator for a shoe drum brake, having an actuator body, an actuating wedge disposed between a pair of force-transmitting tappets slidable in opposed bores of the actuator body and intended, in use, to transmit actuating force to a pair of brake shoes to expand the brake shoes, one of the tappets being split to form outer and inner pistons with a hydraulic chamber between them to permit the pistons to be urged in opposed directions by the application of hydraulic pressure to the chamber, the improvement comprising:

a respective automatic adjustment means operatively associated with each tappet to maintain a substantially constant shoe-to-drum clearance;

the adjustment means associated with the split tappet comprising, a rotatable screw-threaded member between the inner and outer pistons, a screw thread on said outer piston cooperatively engaging with said screw-threaded member, abutment means disposed between the inner and outer pistons, abutment engaging means on the actuator body, means to resiliently urge said abutment means away from said outer piston into engagement with said abutment engaging means, and clutch means operatively engaging said screw-threaded member and said abutment means to control rotation of said screw-threaded member in response to outward movement of said outer piston, so that said outer piston is adjusted independently of the tappet on the other side of the wedge.

2. An actuator as claimed in claim 1 wherein said abutment engaging means comprises a surface on said actuator body.

3. An actuator as claimed in claim 2 wherein:

said inner piston and the corresponding bore in the actuator body have a smaller cross-sectional area than said outer piston and the corresponding bore in the actuator body, respectively; and said abutment engaging surface comprises a shoulder formed by and between said different cross-sectional areas of said corresponding bores for the inner and outer pistons in the actuator body.

4. An actuator as claimed in claim 2 wherein said clutch means comprises a clutch member having a clutch face thereon and further comprising:

a clutch face on said abutment means operatively engaging said clutch face on said clutch member;

a further screw thread on said screw-threaded member; and a screw thread on said clutch member cooperatively engaging said further screw thread.

5. An actuator as claimed in claim 4 wherein said further screw thread and said screw thread on said member are cooperating fast threads, so that interaction of said clutch member with said abutment means and screw-threaded member causes rotation of said screw-threaded member, in response to outward movement of said outer piston, in a direction to set an outwardly adjusted retracted position of said outer piston.

6. An actuator as claimed in claim 5 wherein said screw-threaded member is an elongated hollow cylindrical member, and further comprising:

a cylindrical recess in said outer piston and coaxial therewith;

said screw-threaded member being partially disposed in said recess in said outer piston and spanning the hydraulic chamber between the inner and outer pistons;

said abutment means is a substantially cup-shaped member;

a recess in said inner piston in which said cup-shaped member is partially contained;

resilient means between said abutment member and the inner piston to urge said abutment member outwardly with respect to said inner piston; and predetermined backlash between said cooperating fast threads to provide said shoe-to-drum clearance for the respective shoe adjusted by said split tappet.

7. An actuator as claimed in claim 1 wherein said clutch means comprises a clutch member having a clutch face thereon and further comprising:

a clutch face on said abutment means operatively engaging said clutch face on said clutch member;

a further screw thread on said screw-threaded member; and a screw thread on said clutch member cooperatively engaging said further screw thread.

8. An actuator as claimed in claim 7 wherein said further screw thread and said screw thread on said clutch member are cooperating fast threads, so that interaction of said clutch member with said abutment means and screw-threaded member causes rotation of said screw-threaded member, in response to outward movement of said outer piston, in a direction to set an outwardly adjusted retracted position of said outer piston.

9. An actuator as claimed in claim 7 wherein said abutment means comprises a generally cup-shaped member, and further comprising:

a recess in said inner piston, said abutment member being partially contained in said recess.

10. An actuator as claimed in claim 7 and further comprising:

a predetermined backlash between said further screw thread on said screw-threaded member and said cooperating screw thread on said clutch member to provide said shoe-to-drum clearance for the respective shoe adjusted by said split tappet.

11. An actuator as claimed in claim 1 wherein said abutment means comprises a generally cup-shaped member, and further comprising:

a recess in said inner piston, said abutment member being partially contained in said recess.

12. In an actuator for a shoe drum brake, having an actuator body, an actuating wedge disposed between a pair of force-transmitting tappets slidable in opposed bores of the actuator body and intended, in use, to transmit actuating force to a pair of brake shoes to expand the brake shoes, one of the tappets being split to form outer and inner pistons with a hydraulic chamber between them to permit the pistons to be urged in opposed directions by the application of hydraulic pressure to the chamber, the improvement comprising:

a respective automatic adjustment means operatively associated with each tappet to maintain a substantially constant shoe-to-drum clearance;

the adjustment means associated with the split tappet comprising,
 a rotatable screw-threaded member between the inner and outer pistons,
 a screw thread on said outer piston cooperatively engaging with said screw-threaded member,
 said inner piston and the corresponding bore in the actuator body have a smaller cross-sectional area than said outer piston and the corresponding bore in the actuator body, respectively;
 a recess in said inner piston;
 a generally cup-shaped abutment member disposed between the inner and outer pistons and partially contained in said recess;
 an abutment engaging shoulder formed by and between said different cross-sectional areas of said corresponding bores for the inner and outer pistons in the actuator body,
 means to resiliently urge said abutment member away from said outer piston into engagement with said abutment engaging shoulder,
 a clutch face on said abutment member;
 a further screw thread on said screw-threaded member;
 a clutch member having a clutch face thereon operatively engaging said clutch face on said abutment member; and
 a screw thread on said clutch member cooperatively engaging said further screw thread, to control rotation of said screw-threaded member in response to outward movement of said outer piston so that said outer piston is adjusted independently of the tappet on the other side of the wedge.

* * * * *